(12) United States Patent
Xia et al.

(10) Patent No.: US 7,199,164 B2
(45) Date of Patent: Apr. 3, 2007

(54) HIGH-STRENGTH BLACK POLYURETHANE FOAMS

(75) Inventors: Jusong Xia, Moore, SC (US); Rajnish Batlaw, Soartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/400,216

(22) Filed: Mar. 27, 2003

(65) Prior Publication Data

US 2004/0192797 A1   Sep. 30, 2004

(51) Int. Cl.
*C08G 18/48* (2006.01)

(52) U.S. Cl. .................. 521/99; 521/155; 521/170; 521/174

(58) Field of Classification Search ............... 521/99, 521/155, 170, 174
See application file for complete search history.

(56) References Cited

U.S. PATENT DOCUMENTS

| | | | | |
|---|---|---|---|---|
| 3,775,350 A | * | 11/1973 | Juhas | 428/317.9 |
| 4,166,163 A | * | 8/1979 | DiBella et al. | 521/116 |
| 4,170,564 A | | 10/1979 | Brendle | |
| 4,284,279 A | | 8/1981 | Mori | 369/63 |
| 4,507,407 A | | 3/1985 | Kluger et al. | 521/113 |
| 4,601,725 A | | 7/1986 | Keller et al. | 8/403 |
| 4,846,846 A | * | 7/1989 | Rekers et al. | 8/515 |
| 4,923,903 A | * | 5/1990 | Alm et al. | 521/65 |
| 4,999,418 A | | 3/1991 | Krutak et al. | 528/272 |
| 5,731,398 A | | 3/1998 | Ragsdale et al. | 528/73 |
| 5,925,150 A | | 7/1999 | Ragsdale et al. | |
| 6,294,590 B1 | * | 9/2001 | Ragsdale et al. | 521/130 |
| 6,642,283 B2 | * | 11/2003 | Ragsdale et al. | 521/114 |
| 7,056,958 B2 | * | 6/2006 | Xia et al. | 521/163 |

FOREIGN PATENT DOCUMENTS

| WO | WO 01-94474 | 12/2001 |
|---|---|---|
| WO | WO 01-94484 | 12/2001 |

* cited by examiner

*Primary Examiner*—John M. Cooney, Jr.
(74) *Attorney, Agent, or Firm*—Terry T. Moyer; Robert M. Lanning

(57) ABSTRACT

Black polyurethane foams that exhibit higher strength black colorations without the need for concomitant increases in black colorants therein are provided. Such a resultant jetter black foam article is possible through the unexpectedly effective introduction of small amounts of certain toner compounds or combinations that exhibit specific measurable appearance characteristics. Such toners exhibit at least one absorption peak within a specific range of wavelengths (e.g., from about 560 to 610 nm) and specific ranges of half-height bandwidths (from 40 to 130 nm). Furthermore, such a compound or combination of compounds, is preferably liquid in nature (at room temperature) or in dispersion form and may thus be easily incorporated within target polyurethane precursor compositions for admixture with either black pigments (or dispersions thereof), black polymeric (liquid) colorants, or both. Methods of high strength black polyurethane foam production as well as separate pigmented and liquid polymeric colored foams of such type including the necessary toner compounds and/or combinations, as noted above, are also encompassed within this invention.

5 Claims, 2 Drawing Sheets

HIGH-STRENGTH BLACK POLYURETHANE FOAMS

FIELD OF THE INVENTION

This invention relates to the black polyurethane foams that exhibit higher strength black colorations without the need for concomitant increases in black colorants therein. Such a resultant jetter black foam article is possible through the unexpectedly effective introduction of small amounts of certain toner compounds or combinations that exhibit specific measurable appearance characteristics. Such toners exhibit at least one absorption peak within a specific range of wavelengths (e.g., from about 560 to 610 nm) and specific ranges of half-height bandwidths (from 40 to 130 nm). Furthermore, such a compound or combination of compounds, is preferably liquid in nature (at room temperature) or in dispersion form and may thus be easily incorporated within target polyurethane precursor compositions for admixture with either black pigments (or dispersions thereof), black polymeric (liquid) colorants, or both. Methods of high strength black polyurethane foam production as well as separate pigmented and liquid polymeric colored foams of such type including the necessary toner compounds and/or combinations, as noted above, are also encompassed within this invention.

BACKGROUND OF THE PRIOR ART

Black polyurethane slabstock foams [e.g., foam colors when substantially all of the light in the visible electromagnetic spectrum (400–700 nanometer) is absorbed] are utilized in a variety of articles, including, without limitation, high fidelity speakers, earphones, and the like. Such black colorations are generally provided through pigments or pigment mixtures or through polymeric colorant mixtures (of various colors, such as mixtures of blue, yellow, red colorants). Black colorant compositions may be individual pigments or mixtures with other pigments (particularly other black pigments) or mixtures of two, three or more individual polymeric colorants. Such mixtures generally complement each other to absorb light across the visible spectrum. For example, orange and blue; yellow, red and blue; and orange, blue and purple represent color combinations which will create a black composition. In general, a black colorant composition of one or more black pigments or combinations of two or more dyes or polymeric colorants will absorb electromagnetic radiation across the entire visible spectrum, but the absorbance at each wavelength may not be uniform. Consequently, the absorbance of such a composition may be represented by a series of peaks and valleys across the visible spectrum such that any loss or modification of any of the component absorbance levels may result in the change of jetness or even the hue of the target black coloration.

Polymeric colorants have become the preferred coloration method in industry for colored polyurethane products, such as foams, resins, and the like. Being liquid in nature, these polymeric colorants contain hydroxyl terminated polyoxyalkylene chain (or chains) and actually tend to react to and within the urethane during polymerization. As a result, the color is integrated within the foam and provides excellent uniformity and depth throughout the entire article. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition to form the desired colored foam. Such foamed products require the presence of a catalyst or catalysts to effectuate the desired reaction between the polyol and isocyanate components.

Potential jetness shifts may be caused by improper mixing of component colorants, uneven lighting for viewing, light exposure (and thus, for example, UV degradation of components), and the like. In essence, deep, dark, jet-black shades are generally difficult to provide within such polyurethane foam articles due to the potential for the individual shades (yellow and/or red) either to absorb insufficiently or in excess at maximum wavelengths to the extent that imbalanced absorption by the individual coloring components therein may, in effect, impart a limited jetness appearance (through increased yellowness, redness, or both).

As for black pigments, the colorations are mostly provided by single sources (unless mixtures of different black pigments are present). However, such coloring agents appear to exhibit a limit to color depth, most likely due to the absorption levels inherently provided by the individual pigments themselves. A broad absorption peak, such as that typically exhibited by such pigment materials, imparts a limited jetness effect within certain target articles, most notably here, for black polyurethane slabstock foams. The limited jet-black appearance is most likely the result of certain wavelengths within the absorption spectrum of the specific pigment particles either being "masked" or impeded from view or being too prevalent for perception by the naked eye. The result is a perceived color that is, generally, too yellow or red to impart a deep, dark color within the target black foam. As a result, the resultant yellowing or reddening of the black color compromises the desired jetness thereof, thereby rendering a black coloration exhibiting a limited jetness appearance (empirically).

Therefore, as discussed and/or alluded to above, such black colorations (provided by either pigments or polymeric colorants) typically suffer from a lack of strength, particularly in terms of presence of limited amounts of coloring agents therein, to the extent that the depth of black colorations within the target foam is aesthetically lacking due to such limited jetness appearance. Improvements have been attempted, most notably through increases in the amount of pigment (carbon black, for example) or polymeric black colorant (REACTINT® X77, from Milliken & Company, for example) added; however, in such a manner, the cost of production increases while the relative improvement in color strength is not proportionally better. Such a disparate result thus has led to a return to certain lower levels of pigment or polymeric colorant utilized with the same aesthetically displeasing low-color-strength black results prevalent.

Also, due to the limitation of the existing state of the art dispersion technology, the amount of pigment (carbon black, for example) can be dispersed into liquid media is limited due to extremely high viscosity. Current commercial carbon black dispersions are thus limited in color strength (e.g., the L* value) even with maximum loadings of pigment dispersions or a mixture of polymeric colorants within target foams without affecting ultimate polyurethane foam performance primarily due to high unwanted yellowness and, possibly, redness, levels measured within those previously made black polyurethane foams.

Improvements within the aforementioned polymeric colorant mixtures are as difficult to provide, primarily since the determination of proper levels of each component color can be altered when greater amounts of the total black colorant are introduced within target slabstock foams. Thus, modifications in flairing appearance, or, at least, in the redness and/or yellowness, thereof, are quite possible, such that the desired high-color-strength black foam is difficult to achieve. A simplified procedure and/or formulation to provide such desired high color strength results is thus necessary; unfortunately, to date, such a formulation has not been provided the black polyurethane slabstock foam industry.

DESCRIPTION OF THE INVENTION

It is therefore an object of this invention to provide a novel black colorant composition for the coloration of polyurethane articles that includes at least one toner compound. It is a further object of this invention to provide a novel black colorant composition, comprising either polymeric colorants, pigments, or both, that imparts a jetness level within polyurethane slabstock foam above that for either polymeric colorants or pigments alone. A further objective is to provide a black coloration method for polyurethane production that effectively reduces and/or eliminates color dullness, degradation, and/or shift of hue which in turn improves the perceived jetness thereof, through the presence of a toner compound therein. An additional object of the invention is to provide a single compound or a combination of colorants as a toning (e.g., bluing) agent for black-colored polyurethanes, preferably, though not necessarily, black-colored polyurethane slabstock foams. Additionally, it is an object of this invention to provide a polyol or isocyanate composition comprising a toner compound as a precursor composition for the manufacture of polyurethanes.

Accordingly, this invention is directed to a black-colored polyurethane article comprising at least one black coloring agent, selected from the group of at least one pigment, at least one combination of polymeric colorants that impart a black coloration to said polyurethane, and any mixtures or combinations thereof, and at least one toner compound that imparts darkening effects within said article; wherein, optionally, said at least one toner compound exhibits at least one absorption peak and a $\lambda_{max}$ between 560 and 610 nm within said polyurethane article; and wherein said at least one toner compound exhibits a specific half-height bandwidth range of between 40 and 130 nm in relation to said at least one absorption peak; and, further optionally, wherein said at least one toner compound is a combination of compounds that comprises a first compound exhibiting a single absorption peak and a $\lambda_{max}$ between 560 and 575 nm and a second compound exhibiting a single absorption peak and a $\lambda_{max}$ between 576 and 610 nm. Furthermore, this invention encompasses a liquid solution or dispersion comprising either at least one polyol or at least isocyanate, at least one coloring agent as defined above, and at least one toner compound as defined above, wherein, optionally, said at least one toner compound exhibits the same absorption characteristics as listed above.

Also encompassed within this invention is a method of producing a black polyurethane article comprising the steps of: a) providing a polyol composition; b) providing an isocyanate composition; wherein at least one of the compositions of steps "a" and "b" comprises a black colorant formulation comprising at least one toner compound or combination of compounds; and c) reacting all of the compositions from steps "a" and "b" together in the presence of a suitable catalyst to produce a polyurethane article. A polyurethane article, preferably though not necessarily a foam article, produced by these methods and/or exhibiting a substantially uniform black coloration throughout is also contemplated within this invention.

In general, polyurethane foam is produced through the catalyzed polymerization of the reaction products of polyols and isocyanates. Such a reaction is well known throughout the polyurethane industry and has been practiced for many years. The potential number and types of polyols utilized within this invention are plentiful. Such a compound is defined as comprising at least two alcohol moieties, preferably at least three. The free hydroxyl groups react well with the isocyanates to form the urethane components which are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred is a typical trifunctional polyol, such as F3022 polyol, available from Bayer.

Isocyanates, most preferred diisocyanates, are well known components of such polyurethane foams and include any compounds which possess at least one free cyanate reactive group, and most preferably two, although more may be utilized. Such compounds may also be aliphatic or aromatic in nature. The most prominently utilized isocyanates, and thus the most preferred types for this invention (though not required), are toluene diisocyanate (TDI), diphenylmethane diisocyanate (MDI)(aka, methylene diisocyanate)(others, such as aliphatic isocyanates may be utilized, as well as other aromatic types). The polyol is generally reacted with a slight excess of isocyanate (ratio of from 1:0.85 to 1:1.25) to produce a soft flexible foam product; the greater the ratio, the harder the produced foam). For rigid foams the excess isocyanate index is substantially higher (1:2.0 to 1:4.0). In practice, two separate streams of liquids (one of polyol, the other of isocyanate) are mixed together in the presence of a polymerization catalyst and a blowing agent in order to produce the desired polyurethane foam product. As noted above, this invention is directed to polyurethanes in general, with foam articles most preferred. Laminates, solid articles, and any other type of colored polyurethane, are also encompassed within this invention.

The term "tertiary amine-based catalyst" is intended to encompass any reactive amine catalysts including the gelation/blowing catalysts utilized within polyurethane production which comprises at least one amine constituent. As noted above, amine-based catalysts, and more specifically, tertiary amine catalysts, are widely utilized within such specific foam-producing methods. Two catalysts, in particular, DABCO 33 LV and DMEA, are excellent gelation/blowing catalysts for this purpose. The amount of tertiary amine catalyst required to effectuate the desired urethane polymerization is extremely low, from between 0.05 php to about 1.00 php of the entire foam-making composition.

The term "black coloring agent" is intended to encompass any pigment, pigment dispersion, polymeric colorant, dye, dyestuff, any mixtures thereof, and the like, which provides desirable black colorations to target polyurethane foam articles. In general, such black coloring agents are added to the polyol stream (prior to reaction with the isocyanate) in amounts ranging from about 0.001 php to about 10 php. Higher color loadings are economically unacceptable, not to mention they may cause certain migratory, crocking, and/or bleeding problems. Suitable black pigments for this invention include, without limitation, carbon black, lamp black, and the like, including such pigments that are admixed with certain viscosity modifying agents (propylene carbonate, butyrolactone, and the like), such as those disclosed within PCT Publication Nos. WO/01/94474 and 94484, both to Xia et al. Suitable black polymeric colorants for this purpose are disclosed within U.S. Pat. No. 5,731,398 to Ragsdale et al., again without any limitation, and as merely examples.

Other additives or solvents may also be present within the foam-making composition. Auxiliary blowing agents are required to provide the necessary foam blowing capability and reduce chances of combustion. Such compounds include methylene chloride, acetone, carbon dioxide (which may be liberated during the reaction between water and isocyanate), and the like, and are present in amounts of between about 1.0 php and 10 php of the entire foam-making composition. Water may thus also be added in relatively low amount (i.e., from about 1.5 to about 10 php; most preferably between about 3 and 5.5 php) to provide carbon dioxide for blowing purposes. Silicones may be added to provide desired cell structure and foam stability and are present in an amount from about 0.1 to about 2 php of the entire foam-making composition; preferably from about 0.5 to about 1.6 php.

Toners have been utilized within certain resins in the past, most importantly for the purpose of preventing or neutralizing yellowing within transparent types, such as polyester. However, no such type of compound has been disclosed or fairly suggested as a proper additive within polyurethanes, and specifically, within black polyurethanes, such as, as one example, slabstock foams. Certain writing and/or printing inks have included bluing agents for toning purposes; however, such formulations are uniform in appearance and are generally easy to tone in such a manner for that reason. Foams, by rule, are comprised of individual cells of polyurethane that potentially exhibit differing appearances on an individual level. Thus, toning has not been undertaken within such articles in the past.

Such toners (being pigments or polymeric colorant types themselves) should exhibit at least acceptable stability when exposed to the light, humidity, temperature, and other such drastic conditions associated with polyurethane foam manufacturing. Such bluing agents should also exhibit a minimal degree of thermal degradation (or, conversely, excellent thermal stability) during polyurethane production, desirably at any stage during production, but acceptably at any stage of the article manufacturing process.

For the purposes of this invention, the term "bluing agent" is synonymous with "toner compound". Such a term thus encompasses either a single compound or a combination of compounds that combats and neutralizes the yellowing, reddening, or both, of the target black polyurethane article, which, in turn, imparts a darker and jetter black appearance within target black-colored polyurethane foam articles. As noted above, such yellowing and, possibly, reddening have been determined to provide limited jetness effects to target black polyurethane articles, most notably, though not limited to, black polyurethane slabstock foam articles, thereby creating aesthetic problems therein. The inventive toner for this purpose found unexpectedly provides a bluing effect (e.g., decreasing b* values) that absorbs within the needed wavelength range complementary to any yellow (and possibly red) coloration therein (at least one toner exhibiting a $\lambda_{max}$ from 560 nm to 610 nm; more preferably from 565 to 600 nm; most preferably from about 570–595 nm), particularly with a half-height bandwidth within the range from about 40 to 130. Such a toner (bluing agent) thus imparts a darkening effect to the target black colored polyurethane foam by combating yellowing and possibly (though not necessarily) by combating reddening to the extent that such a foam article exhibits an L* value corresponding to a black color strength comparable at least to the approximate level achieved by an article colored with the same black coloring agent but without any toner present. Thus, in every instance an inventive toner additive is present the b* value is decreased (thus indicating an increase in the blueness and thus a reduction in yellowness) in comparison with the same non-toned black sample (but comprising either the same or a lower amount of black coloring agent than the non-toned article). In some situations, and thus with certain toner additives, the redness, or a* value, of the target black foam is reduced as well in comparison with the same type of non-toned black foam sample. Furthermore, the L* value may also be reduced for the target black foam sample upon introduction of a toner additive within the manufacturing (polymerization and coloring) process as well (although an L* value reduction in comparison with a non-toned sample is, again, not necessary to achieve the desired jetness improvements mentioned above).

In addition, it was determined that such a variable as absorption was not the only necessary toner (bluing agent) property required to provide the best overall bluing characteristics to darken the black effect (jetness) within the target polyurethane foam with a lower amount of black colorant required to attain such dark levels. Thus, a single peak or narrow multiple peaks exhibited by such a toner (or toners) facilitates addition and control of the needed final jetness result. Of equal importance was determined that a single absorption peak required a specific half-height bandwidth range for a number of reasons. Most importantly, such a specific half-height bandwidth range has been found to impart a significant dark result in the target polyurethane article, and thus an increase in overall jetness of the black foam (through, as noted above, what is believed to be a reduction in yellowing, reddening, and/or other discolorations that effect the perceived jetness thereof). Most standard bluing agents for typical writing and/or printing inks, polyesters, and other types of non-polyurethane-based articles tend to provide excellent neutralization of yellowness within target media; however, generally, and particularly within certain end-use articles, such as printing inks and clear or transparent thermoplastics, the half-height bandwidths of such additives are so broad that absorption values are extensive over a broader range of wavelengths to the extent that such toners not only effectively neutralize the yellowness, but also dull the finished drawn-down ink or finished plastic article. Although this invention includes, in its broadest scope, the presence of any bluing agents for toning of the target black polyurethane articles herein, it has been found that optimum effects are provided through the inventive addition of such specific toners as noted above. In particular, the limited jetness appearance imparted by addition of pigments alone has been remedied unexpectedly through the utilization of toners first, and more pointedly and successfully, through addition of the narrow half-height bandwidth types noted above. However, it is also foreseen that too narrow a half-height bandwidth may produce unwanted different colors (such as, for example, green colorations) within the finished article due to a potential lack of proper complementary absorption capabilities from a broad enough perspective to combat redness and/or yellowness completely. The specific limit on narrowness in such a situation is not known, however, although, again, it is foreseen that a limit to the effectiveness upon too narrow a measurement does exist.

Black colorations within polyurethane foams are accorded with any number of different coloring agents. Most prominently used are polymeric colorant combinations (as noted above), such as REACTINT® Black X77 (from Milliken & Company) or pigments, such as carbon black, lamp black, and the like. Such pigment coloring agents may be present either in solid, powder form or in dispersion form (for ease in handling and introduction), such as a mixture of 90% by weight of carbon black dispersion (in particular, UNION BLACK™ 3U-600 from Union Chemical) and 10% by weight of propylene carbonate, RYVEC Black DR 2100 (from Ryvec), REBUS Black 2106, and REBUS Black 2125 (both from Rebus). Many other black coloring agents useful within this invention, particularly similar black pigments and pigment mixtures to those above.

Such a toner compound can be added in the amount from about 0.1 to about 15% (with from about 0.05 to about 7.5% of each individual component within the inventive combination permitted; preferably from about 0.5 to about 6% each; more preferably from about 1 to about 5% each; and most preferably from about 1.5 to about 4.5% each) of the total parts of black coloring agent present within (aka, added to) the target polyurethane foam. The level of loadings depends highly upon the strength of the colorant needed to provide the desired anti-yellowing, -reddening, -jetness limiting, etc., effect while also not contributing an excess in blue or violet discoloration to the target polyurethane. The class of compounds that exhibits such effective and beneficial combined characteristics includes those within the noted range of narrow wavelengths above. Thus, a violet or bluish-violet colorant exhibiting an absorption maximum of between about 560 to 610 nm is preferred for such purpose. The class of individual compounds that exhibit such effective and beneficial characteristics include violet and violet bluish colorants (noted from the absorption spectrum range above), potentially preferred to be liquid or pigment dispersion; most preferred but not necessarily liquid in nature, and include a chromophore with poly(oxyalkylene) pendant chains thereon of at least 2 moles of oxyalkylene per alcohol chain. Such colorants are generally referred to as polymeric colorants, disclosed on a general basis within numerous patents assigned to Milliken & Company, and marketed by the same corporation under the tradenames REACTINT® and LIQUITONE®, as examples. Preferred are polymeric violet blue colorants that exhibit a $\lambda_{max}$ within the proper range of wavelengths (i.e., preferably between 560 and 610 nm). Such colorants should also preferably exhibit a single peak within this range as well as a half height bandwidth of from about 40 to about 130 nm, more preferably at most 120 nm, still more preferably from about 50 to 115 nm, and most preferably from about 60 to about 110 nm, all in order to provide the best overall anti-yellowing capabilities with provision of high jetness levels within target black polyurethane foams. The more preferred colorant types are violet blue colorants having triphenylmethane- or thiophene-based chromophores and polymeric chains thereby making the colorants liquid at room temperature and in a non-diluted, pure state. The most preferred types are selected from those conforming with the structures of Formulae (I) or (II), all providing either blue or violet shades (all uses of the word alkyl or alkylene throughout is intended to mean from 1 to 18 carbons, unless otherwise noted):

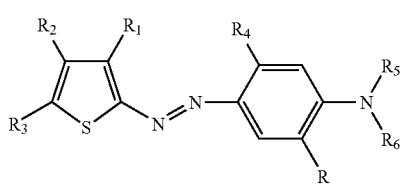

(I)

wherein $R_1$, $R_2$, and $R_3$ are the same or different and independently selected from the group consisting of hydrogen, hydroxyl, straight $C_1$–$C_{20}$ alkyl, $C_1$–$C_{20}$ alkoxy, cyano, sulfonyl, nitro, phenyl, substituted phenyl, cycloalkyl, carboxyl, amido, and branched $C_1$–$C_{20}$ alkyl groups; R and $R_4$ are the same or different and are selected from the group consisting of hydrogen, hydroxyl, straight and branched $C_1$–$C_{20}$ alkyl, $C_1$–$C_{20}$ alkoxy groups; $R_5$ and $R_6$ are the same or different and are selected from the group consisting of hydrogen, $C_1$–$C_{20}$ alkyl, $C_1$–$C_{20}$ alkoxy, phenyl and substituted phenyl, and [polyoxyalkylene constituent]$_z$R', wherein z is from 1 to 20 (indicating an average number of moles of oxyalkylene present, and thus is not required to be an integer); polyoxyalkylene constituent is selected from the group consisting of at least one monomer selected from the group consisting of at least one $C_2$–$C_{20}$ alkyleneoxy group, glycidyl, or mixtures thereof; and R' is selected from the group consisting of hydrogen, $C_1$–$C_{20}$ alkyl, $C_1$–$C_{20}$ alkylester, halo, hydroxy, thio, cyano, sulfonyl, sulfo, sulfato, aryl, nitro, carboxyl, $C_1$–$C_{20}$ alkoxyl, amino, alkylamino, acrylamino, $C_1$–$C_{20}$ alkylthio, alkylsulfonyl, $C_1$–$C_{20}$ alkoxylcarbonyl and phenylthio. Most preferably groups $R_5$ and $R_6$ represent, hydroxyl-terminated $C_1$–$C_8$ poly(oxyalkylene) groups (including monomers such as, preferably, ethylene oxide, propylene oxide, and any combinations thereof).

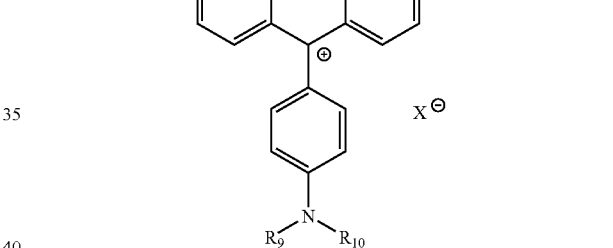

(II)

wherein $R_5$ and $R_6$ are as defined above; $R_7$, $R_8$, $R_9$ and $R_{10}$ are the same or different and are selected from the group consisting of hydrogen, $C_1$–$C_{20}$ alkyl, $C_1$–$C_{20}$ alkoxy, phenyl and substituted phenyl, and [polyoxyalkylene constituent]$_z$R', within z is from 1 to 20 (indicating an average number of moles of oxyalkylene present, and thus is not required to be an integer); polyoxyalkylene constituent is selected from the group consisting of at least one monomer of at least one $C_2$–$C_{20}$ alkyleneoxy group, glyccidyl, or mixtures thereof; and R' is selected from the group consisting of hydrogen, $C_1$–$C_{20}$ alkyl, $C_1$–$C_{20}$ alkylester, halo, hydroxy, thio, cyano, sulfonyl, sulfo, sulfato, aryl, nitro, carboxyl, $C_1$–$C_{20}$ alkoxyl, amino, alkylamino, acrylamino, $C_1$–$C_{20}$ alkylthio, alkylsulfonyl, $C_1$–$C_{20}$ alkoxylcarbonyl and phenylthio; wherein X is selected from the group consisting of F, Cl, Br, I, $NO_2$, $SO_4$, $HSO_4$, $PO_4$, $HPO_4$, $H_2PO_4$, and R"$SO_3$ (wherein each anion is present in the correct number to correspond to the valence number of the cation within the colorant itself); and wherein R" is $C_1$–$C_{20}$ alkyl, or phenyl, or substituted phenyl.

The ratios in the following table regarding such polyoxyalkylene groups thus indicate the following: ethylene oxide (EO)/propylene oxide (PO)/ethylene oxide (EO) (if the third number is present, another group of EO is present; if not then only one group of EO capped with PO is present). The following table (Table 1) further shows the most preferred types, and #1 (having a Color Value of 24 abs/g/l, when diluted with FOMREZ® 11-225, a polyester/polyol from Crompton Corporation, and a half height band width of 98 nm) and #5 (having a Color Value of 60 abs/g/l in its undiluted state, and a half height bandwidth of 78 nm) are the preferred embodiments (the numbers for $R_5/R_6$, $R_7/R_8$ and $R_9/R_{10}$ below are the sums of both groups, for example 2/15/5 indicates 1 mole of EO, 7.5 moles of PO, and 2.5 moles of EO per group; and 5/5 indicates 2.5 moles of EO, and 2.5 moles of PO per group):

TABLE 1

| Toner # | Formula | $R_1/R_3$ | $R_2$ | $R_4/R$ | $R_5/R_6$ | $R_7/R_8$ | $R_9/R_{10}$ | X | λmax | Color |
|---|---|---|---|---|---|---|---|---|---|---|
| 1 | I | CN/CN | Me | Me/H | 2/14/8 | — | — | — | 573 nm | Violet |
| 2 | I | CN/CN | Me | Me/H | 2/10/8 | — | — | — | 573 nm | Violet |
| 3 | I | CN/CN | Me | H/H | 2/7/6 | — | — | — | 566 nm | Violet |
| 4 | I | CN/CN | Me | MeO/MeO | 2/10/6 | — | — | — | 594 nm | Blue |
| 5 | II | — | — | — | 5/5 | Me/Me | 5/5 | ½ SO$_4$ | 590 nm | Blue |
| 6 | II | — | — | — | 2/15/5 | Me/Me | 2/15/5 | ½ SO$_4$ | 590 nm | Blue |
| 7 | II | — | — | — | 2/10/6 | Me/Me | 2/10/6 | Cl | 590 nm | Blue |
| 8 | II | — | — | — | 5/5 | 5/5 | 5/5 | ½ SO$_4$ | 592 nm | Blue |

These polymeric colorants have found utility in the past as individual coloring agents for polyurethanes and as fugitive tints for textiles (the end-use dependent on the degree of polyoxyalkylenation of the base chromophore), as taught within U.S. Pat. Nos. 4,507,407 and 4,601,725. However, such colorants have not been taught or fairly suggested as proper bluing agents for improving jetness within any polyurethane foam articles. As noted above, it was now determined within the scope of this invention that proper toner compounds for such black polyurethane foams necessarily exhibited certain absorption wavelength ranges and narrow half height bandwidths in order to provide the best overall jetness characteristics within target black polyurethanes. The most preferred inventive individual bluing agent, Example toner #5, above, when present within black polyurethane foams at a loading of about 2000–3000 ppm (for example, in a 2 php black foam, the toning compound presented at a level of 10–15% of the total black colorant, a sufficient amount to provide actual violet bluish colorations within a otherwise uncolored polyurethane foams), and thus at a level well above that needed for effective toning purposes but at a level at which proper colorimetric measurements may be taken in order to predict, on a broader scale, proper toning agents without first using low loadings in the target polyurethane foam, imparts excellent toning properties to such target black foam articles. Such measurements as follows are thus intended to provide distinguishing features of the most preferred colorant for utilization as the desired black polyurethane toner. The individual toner compounds therefore exhibit a $\lambda_{max}$ of about 590 nm, and a half-height bandwidth of about 78 nm. Such a compound, as noted in greater detail below, thus provides excellent toning (darkening) results within desired black polyurethane articles. Furthermore, being a liquid, such a toner also can be added easily to any stage of the polyurethane manufacturing process, and can be stored conveniently within a solution or dispersion with either a polyol or an isocyanate for simultaneous and effective introduction within such a manufacturing procedure. As such, this toning agent, being merely one example of the potentially workable class of such colorants, meets all of the necessary requirements noted above.

Further possible toner compounds for black polyurethane foams include blue pigments and/or dyes. The most preferred types are selected from those conforming with the structures of Formulae (III) or (IV), all providing blue shade:

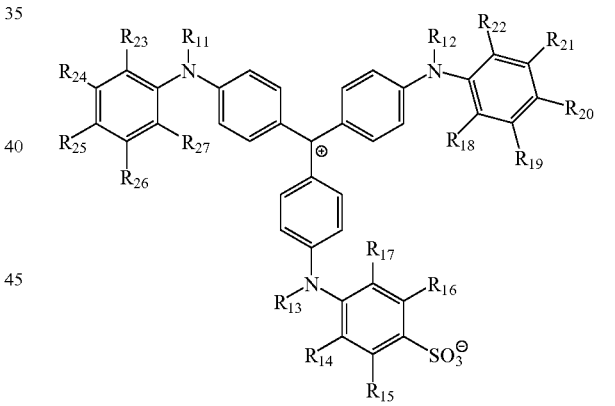

(III)

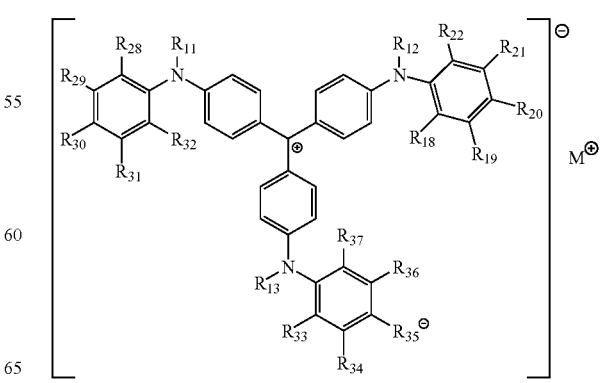

(IV)

wherein M is any metal such as Na, K, Li, Mg, Ca, Cu, Fe, and the like (wherein each cation is present in a number that corresponds the valence of the anionic species); $R_{11}$, $R_{12}$ and $R_{13}$ are the same or different and are selected from the group consisting of hydrogen, $C_1$–$C_{20}$ alkyl, phenyl and substituted phenyl; and $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, $R_{34}$, $R_{35}$, $R_{36}$, and $R_{37}$ are the same or different and are selected from the group consisting of hydrogen, $C_1$–$C_{20}$ alkyl, $C_1$–$C_{20}$ alkoxyl, halo, hydroxy, thio, cyano, sulfonyl, sulfo, aryl, nitro, carboxyl, amino, alkylamino, arylamino, alkylsulfonyl, alkoxycarbonyl, alkylthio and arylthio; and wherein one of $R_{28}$, $R_{29}$, $R_{30}$, $R_{31}$, and $R_{32}$ is a $SO_3^-$ anion, and also one of $R_{32}$, $R_{33}$, $R_{34}$, $R_{35}$, $R_{36}$, and $R_{37}$ is a $SO_3^-$ anion. The most preferred types include, but are not limited to, the reddish shade CI Pigment Blue 18 (Formula IV, in which M=Na; $R_{11}$, $R_{12}$, $R_{13}$, $R_{18}$, $R_{19}$, $R_{20}$, $R_{21}$, and $R_{22}$=H; one of $R_{28}$, $R_{29}$, $R_{30}$, $R_{31}$, and $R_{32}$ is $SO_3^-$, the rest are H; one of $R_{32}$, $R_{33}$, $R_{34}$, $R_{35}$, $R_{36}$, and $R_{37}$ is $SO_3^-$, and the rest are H), greenish shade CI Pigment 56 (Formula III, in which $R_{11}$, $R_{12}$, $R_{13}$, $R_{14}$, $R_{16}$, $R_{17}$, $R_{18}$, $R_{20}$, $R_{21}$, $R_{22}$, $R_{23}$, $R_{25}$, $R_{26}$, and $R_{27}$=H; $R_{15}$, $R_{19}$ and $R_{24}$=Me), and mid shade CI Pigment 61 (Formula III, in which $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, and $R_{27}$=H). Furthermore, the most preferred toners for polyurethane blacks are liquid dispersions containing these pigments, such as ALKALI BLUE™ Flush series of products (available from BASF). And ALKALI BLUE™ FB4365-AB (available from BASF, having a $\lambda_{max}$ 593 nm in MeOH, and a half height bandwidth of 100 nm) is the preferred embodiment. Such a composition accords similar complementary absorption spectra to red and yellow colorations to provide the ability to combat such limited jetness possibilities as noted above.

Resultant black polyurethane foams may be produced through reaction of any black pigment or polymeric colorant combination with such toning compounds. To that end, mixtures of previously prepared pigment/toner mixtures (such as dispersions, and the like) may be admixed with other pigments (alone) or other pigment/toner mixtures, either before introduction within a polyol or isocyanate stream, or simultaneously within any such stream, or simultaneously or sequentially within a polyol/isocyanate admixture during polymerization. Also, the toner may be added separately from the pigment(s) during polyurethane production as well. The same is possible for any number of polymeric colorant combination/toner mixtures or polymeric colorant combinations admixed separately with toner(s) during polyurethane polymerization.

Further criteria which the particular inventive individual toner or combination toners exhibit includes thermal stability while undergo high temperatures during the polymerization process; no degradation of the polyurethane either during processing or once the final product is made; cost effectiveness so as not to translate into higher prices for the consumer; acceptable viscosity in order to permit better processing conditions; homogeneity of dissolution of the toner within the black polyurethane; and substantially no migration of the toner from and within the resultant black polyurethane foam product. The inventive toner compounds exhibit all of these necessary characteristics that thus shows the care and degree and analysis required in order to select the proper toner for introduction within the proper black polyurethane article.

The black polyurethane article comprises about 0.01 to about 20% by weight of black coloring agent. Preferably the amount of black coloring agent (either pigment or polymeric colorant combinations) is from about 0.05 to about 10% and most preferably from about 0.1 to about 8%. Optional additives may include plasticizers, such as dibutyl phthalate, and the like, antistatic agents, stabilizers, antioxidants, antimicrobial, and other similar standard polyurethane additives.

The inventive polymeric toners or liquid dispersions of toner (aka, bluing agent) plus coloring agent plus polyol or isocyanate may include a ratio by parts of polyol to isocynate of from 3:3 to 7:3, with 4:3 preferred for flexible foams, and the colorant present in an amount of from 0.1 to 15% by weight of the total amount of the polyol and isocyanate, and the toner present in an amount from 0.1 to 15% of the total amount of colorant(s) present. Preferably, the colorant is present from 0.2 to 10% of the polyol/isocyanate, and most preferably from 0.5 to 8. The toner is preferably present in an amount from 2–10% by weight of the colorant, and most preferably from 3 to 8%.

Preferred Embodiments of the Invention

Examples of particularly preferred black polyurethanes are below. Initially, commercially available black colorants (both pigments and polymeric colorant mixtures) were first compared for color strength analyses versus inventive dispersions of pigments/polymeric colorant mixtures with toner compounds. The following table indicates both the inventive and comparative combinations of black colorants (all present in an amount of 2 php of the eventual polyurethane foam, unless otherwise noted; the blends of Examples 51–92 and Comparative Examples 99–112 were 50/50 mixtures of the noted pigment and/or polymeric colorants in the additive amounts as respectively noted) tested for this purpose (with the inventive toners and commercially available types without any toners)(note that PC Black, below, indicates the 90% by weight of UNION Black Paste 3U-600 with 10% by weight of propylene carbonate dispersion noted above, and ALKALI BLUE™ indicates ALKALI BLUE™ FB4365-AB from BASF):

TABLE 2

Inventive and Comparative Black Colorant Additives

| Ex. # | Black Colorant | Component (% by weight) |
|---|---|---|
| 12 | PC Black | #1 from Table 1 (2%) |
| 13 | " | #1 from Table 1 (5%) |
| 14 | " | #1 from Table 1 (7%) |
| 15 | " | #1 from Table 1 (10%) |
| 16 | " | #1 from Table 1 (20%) |
| 17 | REBUS Black 2106 | #1 from Table 1 (2%) |
| 18 | " | #1 from Table 1 (5%) |
| 19 | " | #1 from Table 1 (7%) |
| 20 | " | #1 from Table 1 (10%) |
| 21 | " | #1 from Table 1 (20%) |
| 22 | REBUS Black 2125 | #1 from Table 1 (2%) |
| 23 | " | #1 from Table 1 (5%) |
| 24 | " | #1 from Table 1 (7%) |
| 25 | " | #1 from Table 1 (10%) |
| 26 | " | #1 from Table 1 (20%) |
| 27 | RYVEC DR2100 | #1 from Table 1 (2%) |
| 28 | " | #1 from Table 1 (5%) |
| 29 | " | #1 from Table 1 (7%) |
| 30 | " | #1 from Table 1 (10%) |
| 31 | " | #1 from Table 1 (20%) |
| 32 | RYVEC DR2100 | ALKALI BLUE (2%) |
| 33 | " | ALKALI BLUE (5%) |
| 34 | " | ALKALI BLUE (7%) |
| 35 | " | ALKALI BLUE (10%) |
| 36 | PC Black | #5 from Table 1 (2%) |
| 37 | " | #5 from Table 1 (5%) |

TABLE 2-continued

Inventive and Comparative Black Colorant Additives

| Ex. # | Black Colorant | Component (% by weight) |
|---|---|---|
| 38 | " | #5 from Table 1 (7%) |
| 39 | " | #5 from Table 1 (10%) |
| 40 | RYVEC DR2100 | #5 from Table 1 (2%) |
| 41 | " | #5 from Table 1 (5%) |
| 42 | " | #5 from Table 1 (7%) |
| 43 | " | #5 from Table 1 (10%) |
| 44 | REACTINT ® X77 | #5 from Table 1 (2%) |
| 45 | " | #5 from Table 1 (5%) |
| 46 | " | #5 from Table 1 (7%) |
| 47 | " | #5 from Table 1 (10%) |
| 48 | 0.1 php blend of REACTINT ® X77/RYVEC DR2100 | #5 from Table 1 (7%)[1] |
| 49 | 0.5 php of same blend | " |
| 50 | 1 php of same blend | " |
| 51 | 2 php of same blend | " |
| 52 | 4 php of same blend | " |
| 53 | 6 php of same blend | " |
| 54 | 10 php of same blend | " |
| 55 | 0.1 php blend of REACTINT ® X77/RYVEC DR2100 | #5 from Table 1 (7%)[2] |
| 56 | 0.5 php of same blend | " |
| 57 | 1 php of same blend | " |
| 58 | 2 php of same blend | " |
| 59 | 4 php of same blend | " |
| 60 | 6 php of same blend | " |
| 61 | 10 php of same blend | " |
| 62 | 0.1 php blend of REACTINT ® X77/RYVEC DR2100 | #5 from Table 1 (7%)[3] |
| 63 | 0.5 php of same blend | " |
| 64 | 1 php of same blend | " |
| 65 | 2 php of same blend | " |
| 66 | 4 php of same blend | " |
| 67 | 6 php of same blend | " |
| 68 | 10 php of same blend | " |
| 69 | 0.1 php blend of REACTINT ® X77/PC Black | #5 from Table 1 (7%)[4] |
| 70 | 0.5 php of same blend | " |
| 71 | 1 php of same blend | " |
| 72 | 2 php of same blend | " |
| 73 | 4 php of same blend | " |
| 74 | 6 php of same blend | " |
| 75 | 10 php of same blend | " |
| 76 | 0.1 php blend of REACTINT ® X77/PC Black | #5 from Table 1 (7%)[5] |
| 77 | 0.5 php of same blend | " |
| 78 | 1 php of same blend | " |
| 79 | 2 php of same blend | " |
| 80 | 4 php of same blend | " |
| 81 | 6 php of same blend | " |
| 82 | 10 php of same blend | " |
| 83 | 0.1 php blend of REACTINT ® X77/PC Black | #5 from Table 1 (7%)[6] |
| 84 | 0.5 php of same blend | " |
| 85 | 1 php of same blend | " |
| 86 | 2 php of same blend | " |
| 87 | 4 php of same blend | " |
| 88 | 6 php of same blend | " |
| 89 | 10 php of same blend | " |
| (Comparatives) | | |
| 100 | RYVEC Black DR2100 | None |
| 101 | REACTINT ® Black X77 | None |
| 102 | REBUS Black 2106 | None |
| 103 | REBUS Black 2125 | None |
| 104 | PC Black | None |
| 105 | 0.1 php blend of REACTINT ® X77/RYVEC DR2100 | None |
| 106 | 0.5 php of same blend | None |
| 107 | 1 php of same blend | None |
| 108 | 2 php of same blend | None |
| 109 | 4 php of same blend | None |
| 110 | 6 php of same blend | None |
| 111 | 10 php of same blend | None |
| 112 | 0.1 php blend of REACTINT ® X77/PC Black | None |
| 113 | 0.5 php of same blend | None |
| 114 | 1 php of same blend | None |
| 115 | 2 php of same blend | None |
| 116 | 4 php of same blend | None |
| 117 | 6 php of same blend | None |
| 118 | 10 php of same blend | None |

[1]The toner was present as 7% of the RYVEC pigment additive formulation
[2]The toner was present as 7% of the REACTINT ® polymeric colorant combination
[3]The toner was present as 7% of both the RYVEC pigment and the REACTINT ® polymeric colorant combination prior to admixture of both formulations
[4]The toner was present as 7% of the PC Black pigment additive formulation
[5]The toner was present as 7% of the REACTINT ® polymeric colorant combination
[6]The toner was present as 7% of both the PC Black pigment and the REACTINT ® polymeric colorant combination prior to admixture of both formulations These coloring agent examples were then utilized within a polyurethane foam production method to form a finished black foam. Such polyurethane foam articles were produced through the reaction of the following components:

TABLE 3

Polyurethane Components

| Component | Amount (php of the polyol content) |
|---|---|
| F3022 Polyol | 100 parts |
| Water | 5.3 |
| DABCO 33 LV (catalyst) | 0.31 |
| DABCO T10 (catalyst) | 0.48 |
| L520 Silicone (from Crompton) | 1.5 |
| Methylene Chloride | 5.4 |
| 82/20 toluene diisocyanate | 55 |
| Colorant Additive (from Table 2) | (as indicated) |

Upon mixture within a reaction vessel, the reaction created a "health" bubble (indicating satisfactory gelation and blowing balance), and the vessel was then exposed to 185° C. (generated within a microwave oven to simulate actual temperatures encountered on an industrial production level) for about 10 minutes. The resultant foam bun was then sliced in half and analyzed empirically. The jetness of the black foam was then analyzed for each sample.

The respective color strengths (jetness levels, etc.) of each were then measured as in relation to each corresponding comparative through analyses of the improvements provided by such toning agents within polyurethane black colorants in the actual measured redness/greenness (a*) (the greater the a*, the more redness present, and thus the lower the a* the more greenness present), blueness/yellowness (b*) (the greater the b* value, the more yellowness present, and thus the lower the b* value, the more blueness present), and lightness/darkness (L*) (lighter is a greater L* value, darker is lower) of the resultant colorations within target polyurethane foam articles. The CIELAB (a*, b*, and L*) values were measured via a calorimeter in standard fashion for each after foams were made therefrom as provided below.

TABLE 4

Color Measurements For Produced Polyurethane Foams

| Foam Example | Coloring Agent | a* | b* | L* |
|---|---|---|---|---|
| 202 | 12 | 0.49 | 0.54 | 25.4 |
| 203 | 13 | 0.54 | −0.19 | 25.18 |
| 204 | 14 | 0.61 | −0.82 | 25.67 |
| 205 | 15 | 0.67 | −1.72 | 24.7 |
| 206 | 16 | 1 | −4.06 | 24.7 |
| 207 | 17 | 0.16 | −2.43 | 48.6 |
| 208 | 18 | 1.38 | −9.79 | 47.54 |
| 209 | 19 | 2.61 | −13.98 | 44.98 |
| 210 | 20 | 3.71 | −17.47 | 42.75 |
| 211 | 21 | 7.53 | −24.11 | 36.21 |
| 212 | 22 | 0.4 | 0.18 | 24.94 |
| 213 | 23 | 0.47 | −0.8 | 24.22 |
| 214 | 24 | 0.73 | −1.26 | 24.82 |
| 215 | 25 | 0.93 | −2.03 | 27.18 |
| 216 | 26 | 1.26 | −5.29 | 26.04 |
| 217 | 27 | 0.35 | −0.16 | 23.93 |
| 218 | 28 | 0.38 | −0.96 | 24.88 |
| 219 | 29 | 0.43 | −1.6 | 23.82 |
| 220 | 30 | 0.57 | −2.83 | 25.4 |
| 221 | 31 | 1.09 | −5.9 | 24.33 |
| 222 | 32 | 0.18 | 0.12 | 25.37 |
| 223 | 33 | −0.02 | −0.1 | 26.23 |
| 224 | 34 | −0.07 | −0.28 | 26.57 |
| 225 | 35 | −0.24 | −0.47 | 27.66 |
| 226 | 36 | 0.35 | −0.6 | 24.65 |
| 227 | 37 | 0.25 | −1.95 | 23.66 |
| 228 | 38 | 0.18 | −3.56 | 22.59 |
| 229 | 39 | 0.11 | −4.22 | 22.42 |
| 230 | 40 | 0.25 | −0.1 | 25.14 |
| 231 | 41 | 0.14 | −0.75 | 24.99 |
| 232 | 42 | 0.03 | −2.44 | 24.3 |
| 233 | 43 | −0.09 | −4.07 | 23.31 |
| 234 | 44 | −0.13 | −2.73 | 28.9 |
| 235 | 45 | −0.28 | −3.24 | 26.26 |
| 236 | 46 | −0.69 | −5.46 | 26.07 |
| 237 | 47 | −0.84 | −7.43 | 25.5 |
| 238 | 48 | −0.91 | −1.82 | 65.8 |
| 239 | 49 | −0.98 | −2.75 | 45 |
| 240 | 50 | −0.86 | −3.12 | 34.8 |
| 241 | 51 | −0.76 | −3.22 | 26 |
| 242 | 52 | −0.73 | −3.71 | 19.7 |
| 243 | 53 | −0.45 | −2.54 | 17.5 |
| 244 | 54 | −0.34 | −1.73 | 16 |
| 245 | 55 | −0.24 | −0.7 | 64.3 |
| 246 | 56 | 0.09 | −0.6 | 42.1 |
| 247 | 57 | 0.09 | −0.93 | 32.3 |
| 248 | 58 | −0.29 | −2.01 | 25.3 |
| 249 | 59 | −0.26 | −1.96 | 19.9 |
| 250 | 60 | −0.29 | −1.97 | 17.9 |
| 251 | 61 | −0.39 | −2.05 | 15.6 |
| 252 | 62 | −0.24 | −0.78 | 63.7 |
| 253 | 63 | −0.59 | −2.14 | 42.4 |
| 254 | 64 | −0.52 | −2.7 | 32.6 |
| 255 | 65 | −1.17 | −6.32 | 24.6 |
| 256 | 66 | −0.48 | −3.25 | 18.9 |
| 257 | 67 | −0.37 | −3.12 | 17 |
| 258 | 68 | −0.45 | −3.26 | 15.2 |
| 259 | 69 | −0.16 | 0.82 | 66 |
| 260 | 70 | 0.17 | 1.1 | 43.9 |
| 261 | 71 | 0.3 | 0.96 | 33.4 |
| 262 | 72 | 0.29 | 0.6 | 25.4 |
| 263 | 73 | 0.06 | −0.17 | 19.6 |
| 264 | 74 | −0.04 | −0.39 | 17.3 |
| 265 | 75 | −0.17 | −0.59 | 15.4 |
| 266 | 76 | −0.16 | 0.82 | 66 |
| 267 | 77 | 0.17 | 1.1 | 44.2 |
| 268 | 78 | 0.3 | 0.96 | 33.3 |
| 269 | 79 | 0.29 | 0.6 | 25.6 |
| 270 | 80 | 0.06 | −0.17 | 18.9 |
| 271 | 81 | −0.04 | −0.39 | 17.6 |
| 272 | 82 | −0.17 | −0.59 | 15.7 |
| 273 | 83 | −1.41 | −3.86 | 65.8 |
| 274 | 84 | −1.64 | −5.78 | 43.8 |
| 275 | 85 | −1.32 | −5.38 | 33.7 |
| 276 | 86 | −0.2 | −2.33 | 23.8 |
| 277 | 87 | −0.49 | −3.21 | 19.7 |
| 278 | 88 | −0.28 | −2.27 | 17.3 |
| 279 | 89 | −0.31 | −2.01 | 15.8 |
| (Comparatives) | | | | |
| 300 | 100 | 0.27 | 0.24 | 25.15 |
| 301 | 101 | 0.1 | −2.32 | 28.15 |
| 302 | 102 | 0.01 | −0.85 | 49.74 |
| 303 | 103 | 0.42 | 0.73 | 25.61 |
| 304 | 104 | 0.46 | 1.03 | 24.88 |
| 305 | 105 | −0.78 | −0.08 | 67.7 |
| 306 | 106 | −0.79 | −0.46 | 47.2 |
| 307 | 107 | −0.81 | −1.17 | 38.6 |
| 308 | 108 | −0.69 | −1.65 | 29.7 |
| 309 | 109 | −0.3 | −1.27 | 21.7 |
| 310 | 110 | −0.2 | −1.19 | 18.9 |
| 311 | 111 | −0.22 | −0.97 | 16.6 |
| 312 | 112 | −0.16 | 0.82 | 65.7 |
| 313 | 113 | 0.17 | 1.1 | 43.4 |
| 314 | 114 | 0.3 | 0.96 | 33.2 |
| 315 | 115 | 0.29 | 0.6 | 25.5 |
| 316 | 116 | 0.06 | −0.17 | 19.4 |
| 317 | 117 | −0.04 | −0.39 | 17.6 |
| 318 | 118 | −0.17 | −0.59 | 16.5 |

It was thus found that in comparison with the untoned black coloring agents, the correlated toned foams exhibited lower levels of b* values throughout (indicating simultaneous increase in blueness and reduction in yellowness), and each of the lower b* value foams exhibited an empirical jetter black appearance than their comparison foams with the same or greater amounts of colorant present therein. The inventive foams also exhibited at least acceptable L* value levels as an indication of acceptable jetness as well, all at lower levels of black coloring agent therein. For example, the Comparative Example 104 (the PC Black colorant alone at a level of 2 php) L* value was comparable to or higher than the inventive Examples 12–16, and 36–39, including the toned PC Black with a total of 2 php of both the coloring agent and the toning component). Furthermore, as another example, the L* Value of Comparative Example 101 was comparable to or higher than those measured for inventive Examples 44–47. Most of the inventive samples also exhibited lower a* values in comparison with the corresponding non-toned examples as well. As such, throughout the examples, it is evident that through the mere addition of low levels of toning agent, jetter black polyurethane foams may be produced with reduced amounts of black coloring agent present, or, at the very least, comparable jet-black results are possible with such lower levels of black colorant present. The same results are noticeable with the polymeric colorant combinations (with from 20–30% improvements at like amounts of colorant present).

Such unexpected results may also be analyzed by producing build curves for certain toned and untoned examples in specific 1.5 pcf density polyether foam (made in accordance with the formula of Table 3, above) (in terms of L* value modifications with added toner amounts present). For the following tables, A indicates PC Black alone, B indicates PC Black with 5% of #5 from Table 1 added, C indicates PC Black with 7% of #5 from Table 1 added, D indicates REACTINT® X77 alone, E indicates REACTINT® X77 with 5% of #5 from Table 1 added, and F indicates REACTINT® X77 with 7% #5 from Table 1 added. The L* Value results for such examples with different additive loadings are tabulated below:

TABLE 5

L* Values of Black Polyether Foam (Pigment)

| Loading of Total Pigment plus any Toner | A (L* Value) | B (L* Value) | C (L* Value) |
|---|---|---|---|
| 0.1 php | 62.9 | 62.1 | 61.2 |
| 0.5 php | 43.1 | 41 | 39.4 |
| 1 php | 33.5 | 31.1 | 31.1 |
| 2 php | 25.2 | 23.1 | 23.9 |
| 4 php | 20.3 | 18.4 | 19.4 |
| 6 php | 18.4 | 16.8 | 17.2 |
| 10 php | 17.1 | 15.6 | 15.4 |
| 15 php | 16 | 14.5 | 14 |

The results are provided graphically within FIG. 1, thereby showing the ability to provide jetter black results with lower amounts of actual black coloring agent present.

TABLE 6

L* Values of Black Polyether Foam (Polymeric Colorants)

| Loading of Total Polymeric Colorant plus Toner | D (L* Value) | E (L* Value) | F (L* Value) |
|---|---|---|---|
| 0.1 php | 69.9 | 66.7 | 66 |
| 0.5 php | 50.7 | 45.8 | 45 |
| 1 php | 40.3 | 36.2 | 34.6 |
| 2 php | 29.4 | 26.2 | 26 |
| 4 php | 22.6 | 19.7 | 20 |
| 6 php | 21 | 17.3 | 18 |
| 10 php | 20.2 | 15.8 | 15.8 |
| 15 php | 19 | 15 | 14.5 |

The results are provided graphically within FIG. 2, thereby showing the ability to provide jetter black results with lower amounts of actual black polymeric colorant present.

DETAILED DESCRIPTION OF THE DRAWINGS

Figure 1:
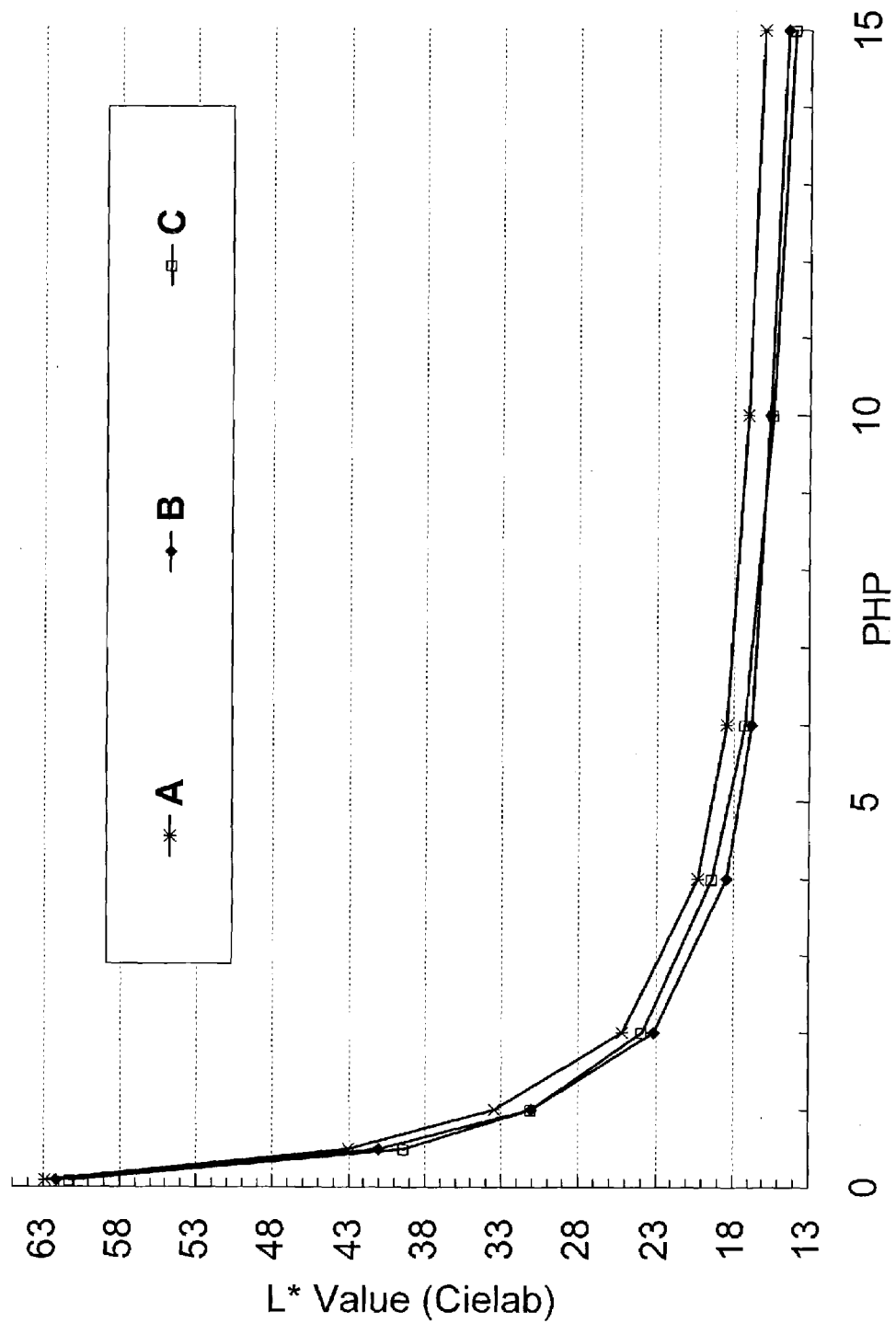
FIG. 1 is a build curve in relation to the results tabulated for Table 5, above, and thus for black pigment alone versus two different levels of toned black pigment colorant formulations for polyether polyurethane slabstock foam.

In FIG. 1, there is supplied the build curve for Table 5, above, showing the modification of L* values for such black polyether foam articles through the introduction of increasing amounts of toner components (bluing agents). Thus, with the loading amount of pigment or pigment plus toner remaining static for each taken measurement along the respective curves, it is evident that the increased amount of toner translates, unexpectedly, into a lower L* value measurement at every measured point along the curves. Thus, the resultant toned black foams exhibit jetter black appearances, even though lower amounts of black pigment are present therein.

Figure 2:
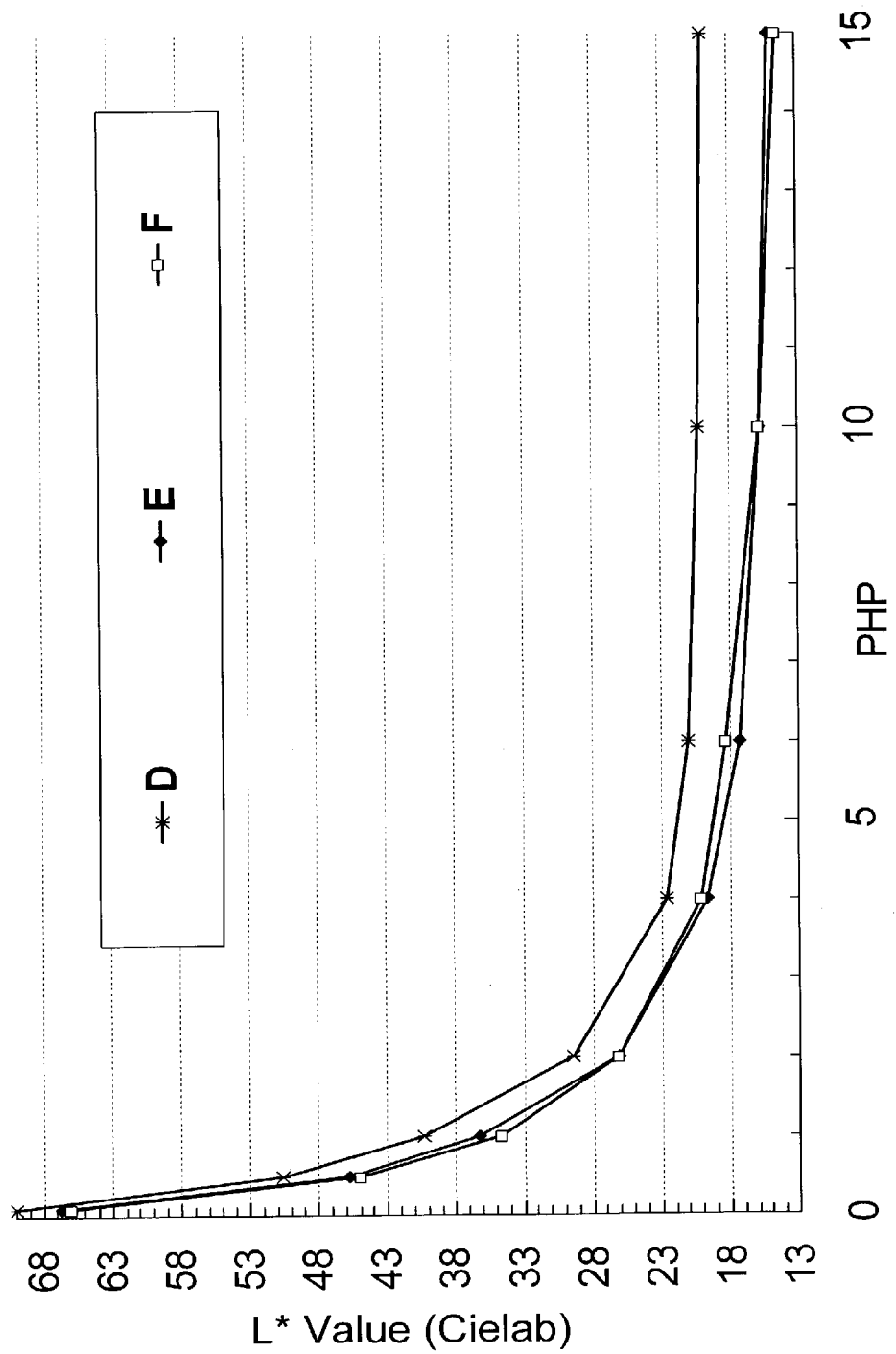
FIG. 2 is a build curve in relation to the results tabulated for Table 6, above, and thus for black polymeric colorant combinations alone versus two different levels of toned black polymeric colorant combination formulations for polyether polyurethane slabstock foam.

In FIG. 2, there is supplied the build curve for Table 6, above, showing the modification of L* values for such black polyether foam articles through the introduction of increasing amounts of toner components (bluing agents). Thus, with the loading amount of polymeric colorant combinations or such a combination plus toner remaining static for each taken measurement along the respective curves, it is evident that the increased amount of toner translates, unexpectedly, into a lower L* value measurement at every measured point along the curves. Thus, the resultant toned black foams exhibit jetter black appearances, even though lower amounts of black polymeric colorant combinations are present therein.

Thus, it is evident that the inventive combination of black coloring agents plus toner (bluing agent) provides the unexpectedly effective jetter black results within polyurethane slabstock foam articles such that greater amounts of black coloring agents are required to provide the same high level of jetness possible with such novel toning/black coloring agent combinations for such polyurethane articles. Stated in another way, then, the presence of a toner permits a reduction in L* and b* values for a black polyurethane slabstock foam article comprising a certain amount of black coloring agent therein as compared to the same black polyurethane slabstock foam article but without any toner present, although the only required reduction is in b* values to provide the perceived jet-black improvement within the target black polyurethane foam articles.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A black-colored polyurethane foam article comprising at least one black pigment and at least one discrete toner compound, the toner compound comprising a triphenylmethane chromophore; wherein said toner compound exhibits at least one absorption peak with a $\lambda_{max}$ between 560 and 610 nm within said article and a half-height bandwidth range of from 40 nm to 130 nm in relation to said at least one absorption peak; and wherein the cumulative mass of said at least one toner compound is in the range of about 0.1 to not more than 6% of the cumulative mass of said at least one black pigment present within the target polyurethane foam article.

2. The article of claim 1, wherein said at least one toner compound exhibits a half-height bandwidth of at most 120 nm in relation to said at least one absorption peak.

3. The article of claim 1, wherein said at least one black pigment is selected from the group consisting of carbon black, lamp black, and any mixtures and combinations thereof.

4. The article of claim 2, wherein said at least one black pigment is selected from the group consisting of carbon black, lamp black, and any mixtures and combinations thereof.

5. The article of claim 1, wherein the triphenylmethane chromophore conforms to the structure of Formula (II)

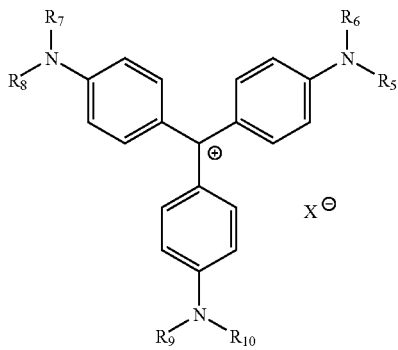

wherein $R_5$, $R_6$, $R_7$, $R_8$, $R_9$, and $R_{10}$ are the same or different and are selected from the group consisting of hydrogen, $C_1$–$C_{20}$ alkyl, $C_1$–$C_{20}$ alkoxy, phenyl and substituted phenyl, and [polyoxyalkylene constituent]$_z$R', wherein z is from 1 to 20, polyoxyalkylene constituent comprises at least one monomer selected from the group consisting of a $C_2$–$C_{20}$ alkyleneoxy group, glycidyl, or mixtures thereof, and R' is a group selected from the group consisting of hydrogen, $C_1$–$C_{20}$ alkyl, $C_1$–$C_{20}$ alkylester, halo, hydroxy, thia, cyano, sulfonyl, sulfo, sulfate, aryl, nitro, carboxyl, $C_1$–$C_{20}$ alkoxyl, amino, alkylamino, acrylamino, $C_1$–$C_{20}$ alkyithic, alkylsulfonyl, $C_1$–$C_{20}$ alkoxylcarbonyl and phenyithia; wherein X is selected from the group consisting of F, Cl, Br, I, $NO_2$, $SO_4$, $HSO_4$, $PO_4$, $HPO_4$, $H_2PO_4$, and R'$SO_3$ and R' is selected from the group consisting of $C_1$–$C_{20}$ alkyl, phenyl, or substituted phenyl.

* * * * *